United States Patent [19]
McAuliffe

[11] 3,759,086
[45] Sept. 18, 1973

[54] ANALYSIS METHOD

[75] Inventor: Clayton D. McAuliffe, Fullerton, Calif.

[73] Assignee: Chevron Research Company, San Francisco, Calif.

[22] Filed: May 24, 1971

[21] Appl. No.: 146,348

[52] U.S. Cl. .............................. 73/19, 23/230 HC
[51] Int. Cl. ............................................ B01d 57/00
[58] Field of Search ..................... 73/19, 23, 23.1, 73/61.1; 23/230 R, 230 M, 230 EP, 230 B, 230 HC; 55/38, 39, 53

[56] References Cited
UNITED STATES PATENTS

| | | | |
|---|---|---|---|
| 2,861,450 | 11/1958 | Ransley | 73/19 |
| 2,987,912 | 6/1961 | Jacobson | 73/19 |
| 3,060,723 | 10/1962 | Kapff et al. | 73/19 |
| 3,422,664 | 1/1969 | Ayers | 73/23.1 |

FOREIGN PATENTS OR APPLICATIONS

43/2163  12/1964  Japan ................................. 73/19

Primary Examiner—Richard C. Queisser
Assistant Examiner—Anthony V. Ciarlante
Attorney—R. L. Freeland, G. F. Magdeburger, E. J. Keeling and J. A. Buchanan, Jr.

[57] ABSTRACT

A method is provided for determining the presence of compounds in aqueous solutions by utilizing repeated equilibrations of a nonreactive gas with an aqueous sample containing such compounds and analyzing the gas from such repeated equilibrations to determine compounds present in the liquid.

4 Claims, 8 Drawing Figures

Patented Sept. 18, 1973

INVENTOR
CLAYTON D. McAULIFFE
BY Edward D Keeling
Ralph L. Freeland Jr.
ATTORNEYS Patented Sept. 18, 1973  3,759,086

INVENTOR
CLAYTON D. McAULIFFE
BY Edward L Keeling
Ralph L Freeland Jr.
ATTORNEYS 3,759,086

ANALYSIS METHOD

BACKGROUND OF THE INVENTION

This invention relates to a method of determining the presence of compounds in aqueous solutions utilizing repeated equilibrations of a nonreactive gas with the aqueous sample suspected of containing such compounds and analysis of the gas obtained from such equilibrations and, more particularly, this invention relates to measurements of widely varying concentrations of hydrocarbons dissolved in water based on successive gas chromatographic analysis after repeated equilibrations of helium with an aqueous sample containing dissolved hydrocarbons.

Many fields require the measurement of widely varying concentrations of hydrocarbons dissolved in water. These fields include pollution control, petroleum exploration, and biochemical research, among others. Several gas chromatographic techniques are available for measuring hydrocarbons in specific situations, but no one method satisfactorily meets the requirements for most analytical problems. Equilibration of the aqueous sample with an immiscible solvent has been used. However, the solvent also extracts nonhydrocarbon organic compounds, hydrocarbons are subject to loss from the solvent, and the solvent often interferes with the analysis. Direct injection of the water sample and elimination of the water by adsorption, reaction, or retardation have also been used. The amount of water that can be handled by these methods limits sensitivity, and nonhydrocarbon organic compounds interfere. Exhaustively stripping the aqueous phase with a gas followed by trapping the hydrocarbons in cold traps permits high sensitivity, but non-hydrocarbon organic compounds again interfere. A procedure employing a single equilibration of a gas phase with the aqueous sample and analysis of the gas phase gives high sensitivity and major separation of hydrocarbons from non-hydrocarbon organic compounds dissolved in water. This method gives good results for the analysis of alkanes which partition to the extent of 96% or higher into a volume of gas equal to the volume of sample. However, cycloalkane, olefin, acetylene, and aromatic hydrocarbons partition from about 15-90% into the gas phase so that calibrations must be made. Furthermore ionic solutes alter the partition coefficient so that calibration with solutions of known ionic strength is required.

BRIEF DESCRIPTION OF THE PRESENT INVENTION

In a broad aspect the present invention provides for determining the presence of compounds in aqueous solutions by isolating a volume of liquid containing such compounds in solution and adding to such isolated volume of liquid a known amount of a gas which does not react with the compounds or the liquid. Equilibrium is established between the compounds in the solution and the nonreactive gas phase. The gas phase is separated so that only the liquid remains and the gas is analyzed for compounds. The above steps are repeated on the same liquid sample at least one additional time since it has been demonstrated that the analysis of the gas phase after two successive phase equilibriums gives all data generally required in such determinations.

In a more specific aspect, the present invention relates to multiple phase equilibrations for analysis of hydrocarbons dissolved in water. The present method retains the advantages of gas equilibration while permitting accurate hydrocarbon measurements on aqueous samples of unknown ionic composition. It is based on successive gas chromatographic analyses after repeated equilibrations of helium with an aqueous sample containing dissolved hydrocarbons. Alkane, cycloalkane, olefin, acetylene, cycloolefin, and aromatic hydrocarbons having up to 10 carbon atoms in the molecule can be determined. Gas chromatographic data on the successive equilibrium gas phases are plotted and back-extrapolated to the hydrocarbon concentration in the original aqueous sample. For hydrocarbons such as alkanes, which partition 96% or greater into the gas phase, it is more convenient and accurate to sum the amount extracted for the first two equilibrations instead of back-extrapolating.

The method gives qualitative separation of hydrocarbons from highly water-soluble organic compounds. Thus, dissolved hydrocarbons can be determined in various aqueous media, such as fresh water, seawater, subsurface brines, and biological fluids.

The method of the present invention is exemplified herein for the analysis of hydrocarbons dissolved in water. Other embodiments of the method permit many other diverse determinations. These include estimation of distribution coefficients, Henry's law constants, vapor pressure, solubility and several related thermodynamic parameters. It is also useful as a go/no-go test of high sensitivity.

PRINCIPAL OBJECT OF THE PRESENT INVENTION

A principal object of the present invention is to provide a method of analyzing for compounds in aqueous solutions by performing at least two equilibrations of an aqueous sample with a nonreactive gas and analyzing the gas obtained from such equilibrations for such compounds. Further objects and advantages of the present invention will become apparent from the accompanying drawings and description.

DETAILED DESCRIPTION OF THE INVENTION

Figure 2:
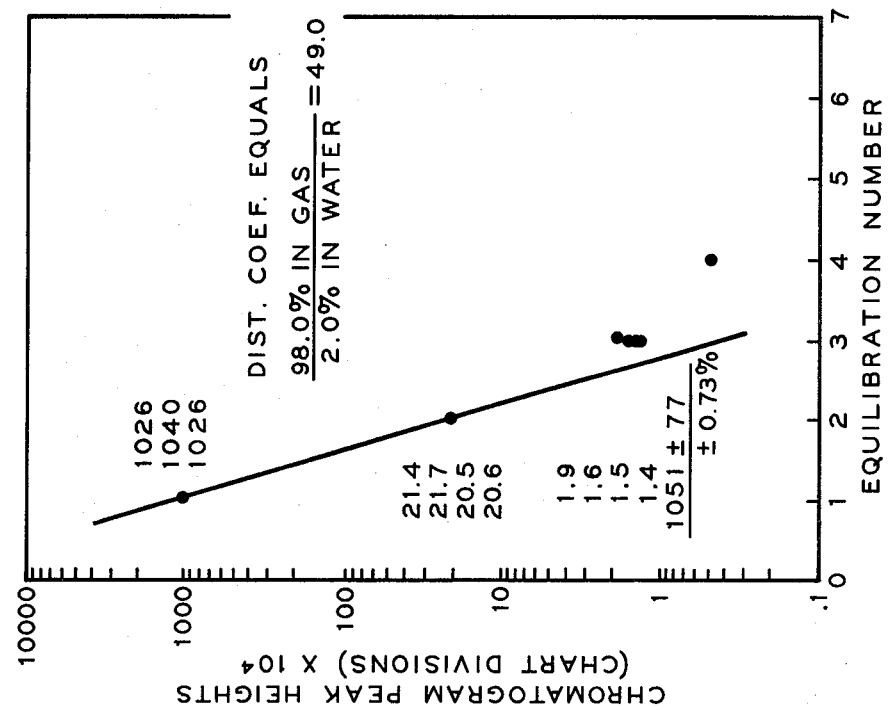
FIG. 2 is a graph illustrating partitioning of n-hexane between equal volumes of tap water and helium at 25° C for successive equilibrations.

The present invention provides for determining the presence of compounds in aqueous solutions by first isolating a sample of liquid containing foreign compounds in solution in a non-gaseous environment. A known amount of a gas which is not reactive with the liquid or the foreign compounds is then added to the liquid sample in the isolated environment. Equilibrium is established between the compounds in the liquid and the gas phase. The gas phase is then removed so that only the liquid phase sample remains in the isolated environment. The gas phase is then analyzed for compounds and the above steps are repeated at least one more time on the isolated liquid sample.

In a preferred form the present invention provides for using a hypodermic syringe to make the multiple equilibrations. Typically, a 50-ml glass hypodermic syringe with Luer-Lok fitting is flushed several times with portions of the aqueous samples, of which 25 ml is finally retained. 25 ml of helium, nitrogen or other hydrocarbon-free nonreactive gas is added and the syringe capped. It is then vigorously shaken (a paint shaker is recommended) for 3–5 min to establish equilibrium between phases. Twenty to 23 ml of the gas phase is then flowed through the sample loop (preferably previously evacuated) of the gas chromatograph, and then a measured volume, usually from 1–10 ml of the gas is introduced for analysis.

The remaining gas in the syringe is carefully discharged by moving the solution to the syringe tip, and 25 ml of fresh helium is added. The equilibration process is repeated as many times as is required for the specific application. If water should be lost during one of the analyses, it is necessary only to add a correspondingly smaller amount of helium — i.e., the ratio of the volume of gas phase to water phase must be kept constant. Similarly, temperature must be kept constant during successive equilibrations. During the equilibrations described herein temperature was controlled to about ±1° C by laboratory air-conditioning. The materials, the chromatograph, the integrator, and calibration procedures were described in Physical Chemistry 70, 1267 (1966). This paper is incorporated herein by reference.

Table 1 set out below develops the significant mathematics. It is apparent that a plot of the log of the hydrocarbon concentration in the gas phase vs. the number of equilibrations produces a straight line.

The negative slope of this line is the log of the distribution coefficient plus one. The intercept is the product of the initial concentration of the unknown, this distribution coefficient, and a constant related to the sample size, the instrument, and its sensitivity.

TABLE 1

MATHEMATICS OF MULTIPLE PHASE EQUILIBRATION

Let
$X_i$ = quantity of compound $x$ in the system during the $i$th equilibration
$G_i$ = quantity of $x$ in the light (gas) phase, of volume $V_G$ during the $i$th equilibration
$L_i$ = quantity of $x$ in the liquid phase, of volume $V_L$, during the $i$th equilibration Then
$$X_i = G_i + L_i \quad (1)$$

and
$Hx_i = G_i V_G / L_i V_L$, where Hx is the Henry's law constant or distribution coefficient (2)

But if $V_G = V_L$ and $Hx_i = Hx$ a constant
Then from Equations 1 and 2

$$G_i = HxX_i/(Hx + 1) \quad (3)$$

$$L_i = X_i/(Hx + 1) \quad (4)$$

And the faction, $f$, of the total $x$ in each phase is $$f_G = Hx/(Hx + 1) \quad (5)$$

$$f_L = 1/(Hx + 1) = 1 - f_G \quad (6)$$

Furthermore from Equation 3

$$G_{i+1} = Hx/(Hx + 1)(X_i - G_i) \quad (7)$$

Substituting from Equation 3 for $G_i$ in Equation 7 and simplifying give $$G_i + 1 = HxX_i/(Hx + 1)^2 \quad (8)$$

and division of Equation 3 by Equation 8 gives on solution for Hx $$Hx = G_i/(G_i + 1) - 1 \quad (9)$$

Thus Hx can be determined from gas composition of two adjacent equilibrations only.

Furthermore, generalization of Equation 8 gives $$G_n = HxX_o/(Hx + 1)^n \quad (10)$$

or $$\log G_n = an + b$$

where $a = -\log(Hx + 1)$
$b = \log HxX_o$

Thus, a semilog plot of $G_n$ vs. $n$ is linear with the slope a function of Hx only and the intercept a function of initial sample composition, $X_o$.

Although this may sound complex, the desired computations can readily be performed. From the semilog line read any two adjacent gas phase concentrations. Divide the greater by the lesser and subtract 1. This is Hx, the distribution coefficient. Note the intercept of the line, divide it by Hx, and one has the desired concentration in the original sample after correction for instrument response and sample size. Data for this correction are derived from analysis of gas samples of known composition in the conventional way. These operations are exemplified in Table 2.

TABLE 2

| Equilibration no. | Gc peak height | $G_i/G_{i+1}$ |
|---|---|---|
| 1 | 392 | |
| 2 | 311 | 1.260 |
| 3 | 239 | 1.301 |
| 4 | 194 | 1.232 |
| 5 | 151 | 1.285 |
| 6 | 119 | 1.269 |
| 7 | 92.3 | 1.289 |
| 8 | 72.4 | 1.275 |
| 9 | 56.8 | 1.275 |
| 10 | 45.3 | 1.254 |

Median $G_i/G_{i+1}$ = 1.271
1.271 − 1 = 0.271
Intercept = 502
Xo = 502/0.271 = 1852

Figure 1:
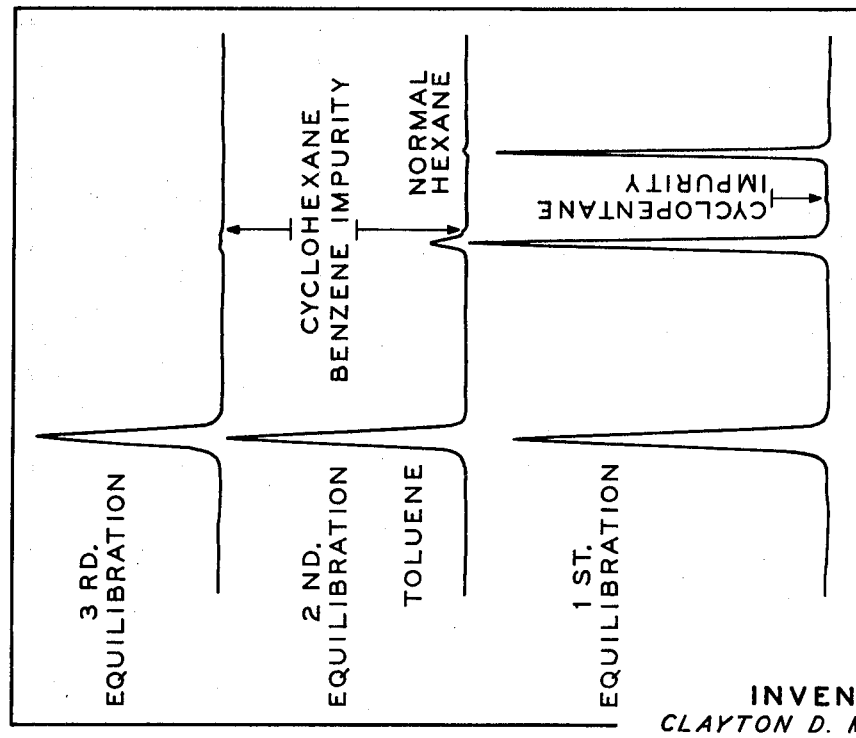
FIG. 1 is a graph showing results from three equilibrations for three different classes of hydrocarbons in equal volumes of tap water and helium at 25° C for successive equilibrations.

Variations in the way that different classes of hydrocarbons partition is shown graphically in FIG. 1. The original solution was formulated in tap water to give approximately the same peak heights for the first equilibration for benzene, cyclohexane, and n-hexane. The results of the first equilibration shows approximately equal peak heights, as well as a small peak for cyclopentane, which was an impurity in the cyclohexane standard. The second equilibration resulted in a small n-hexane peak, a small cyclohexane peak, and a toluene peak reduced by approximately 20%. A small benzene peak exists as an impurity from the toluene sample. The third equilibration shows no n-hexane peak, a very small cyclohexane peak, a small benzene peak, and toluene as the major hydrocarbon remaining.

FIG. 1 graphically demonstrates that the first equilibration removes most of the alkane, and that two equilibrations remove the majority of cycloalkane, leaving predominantly aromatic hydrocarbon in the aqueous phase. Olefin and acetylene hydrocarbons would distribute between the water and gas phases with different distribution coefficients from alkane, cycloalkane, and aromatic hydrocarbons. If present in the water sample, they could also be identified and measured. For example, the percentages of total hydrocarbon in the gas phase, calculated from solubilities and vapor pressures for equal volumes of gas and distilled water for 1-pentene, 1,4-pentadiene, and 1-pentyne are 94, 83, and 51, respectively.

Because alkanes have low solubilities in water, 96+% partitions into the gas phase when equal volumes of gas and water are equilibrated. For this reason two, or at most three, equilibrations will transfer all of the alkanes present into the gas phase. FIG. 2 demonstrates this for n-hexane. The numerical values next to the points are the n-hexane concentrations in the gas phase for four separate analyses on tap water. Note that 99.8% of n-hexane has been transferred after two equilibrations.

The deviation of the third and fourth equilibration points from the line, magnified by the log scale and large slope, was caused by experimental error. Each succeeding equilibration was slightly contaminated by fluid from the preceding equilibrations, and was trapped between the plunger and the wall of the syringe during manipulation.

Because all (>99%) alkanes are removed by two equilibrations, it is quicker and more accurate to sum the concentrations in the gas phases of the two equilibrations than to extrapolate to get the original concentration.

Figure 3:
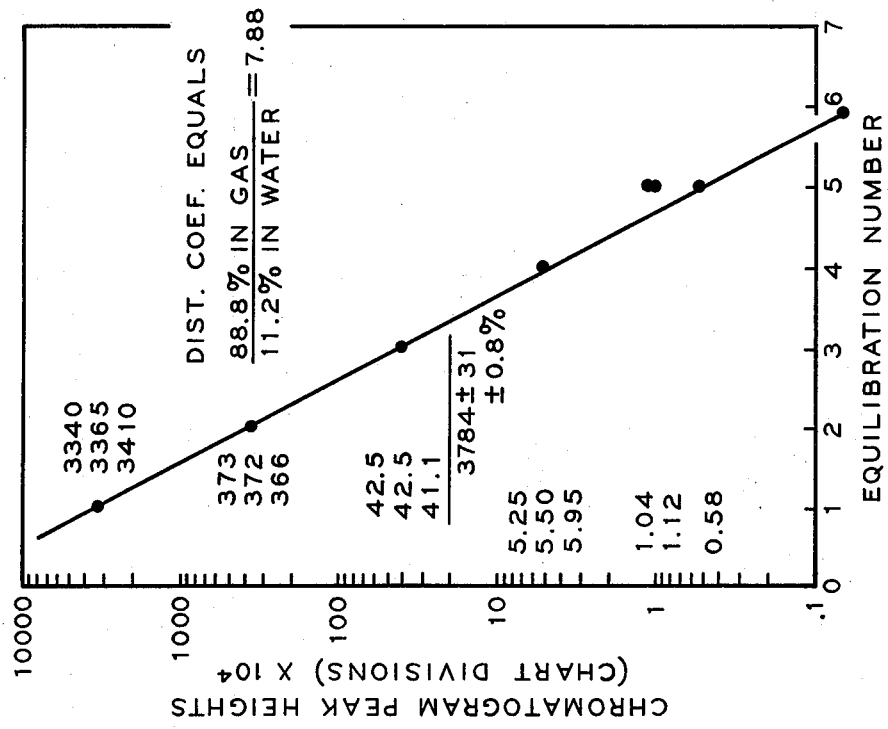
FIG. 3 is a graph illustrating partitioning of cyclohexane between equal volumes of tap water and helium at 25° C for successive equilibrations.

Cycloalkanes partition less into the gas phase than do alkanes. FIG. 3 shows the concentrations of cyclohexane in the gas phase for successive 25° C equilibrations for three separate analyses of tap water containing 55 ppm cyclohexane. Cyclohexane partitions 88.8% into the gas phase. After three equilibrations, cyclohexane has been 99.7% transferred, so a summation of the gas phase concentrations for three equilibrations gives the concentration of cyclohexane in the water sample. A least squares fit for three equilibrations gives a back-extrapolated value of 54.8 ppm, a close check against 55.0 ppm, obtained by summation of the first three equilibrations.

The results of the fourth and fifth equilibrations deviate from a straight line because of, as before, solution left between the plunger and cylinder of the glass syringe. After four equilibrations, one of the samples was transferred to a clean dry syringe, and equilibrations number five and six were carried out. These two points are in line with the values at equilibration four, confirming that it was solution existing between the plunger and cylinder of the syringe that was the source of error. This error, however, is of no great significance, because it does not become apparent until more than 99% of the hydrocarbon has entered the gas phase.

Figure 4:
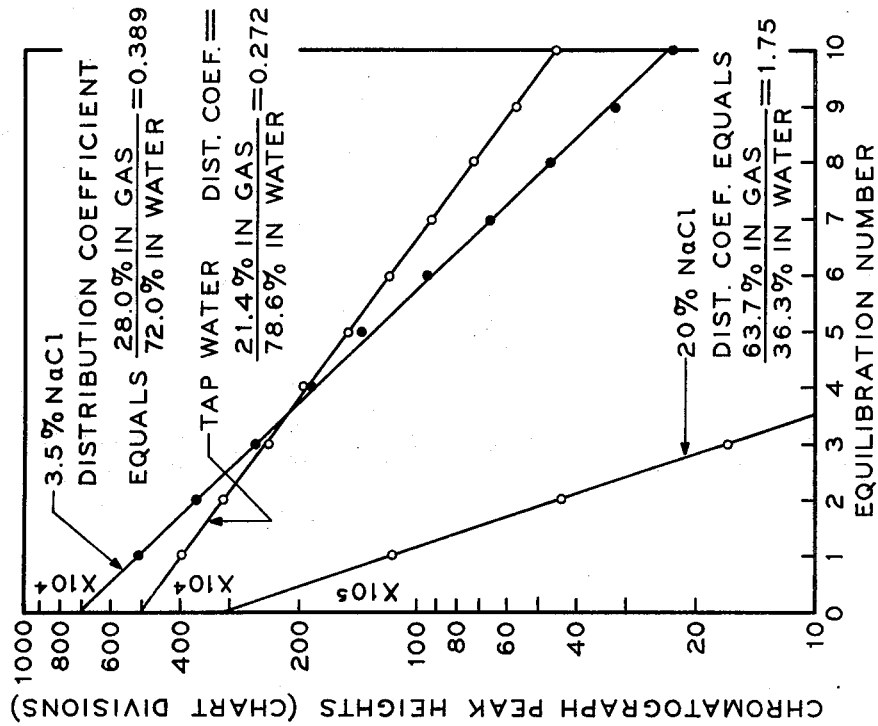
FIG. 4 is a graph illustrating partitioning of toluene between equal volumes of three salinity waters and helium at 25° C for successive equilibrations.

Because of their relatively high solubilities in water in relation to their vapor pressures, aromatic hydrocarbons remain principally in the water phase when equal volumes of water and gas are equilibrated. FIG. 4 shows the actual data points for repeated equilibration of toluene with waters of varying salinity. It is apparent that unless the water is highly saline, many equilibrations would be required to extract the majority of the toluene. Therefore, the most convenient method for determining the original concentration is to fit a straight line to the data points and back-extrapolate.

Although 10 equilibrations are shown for toluene, in both tap water and 3.5% sodium chloride solution, two or three equilibrations give reasonable accuracy and 4 or 5 as good accuracy as do 10 equilibrations.

Figure 5:
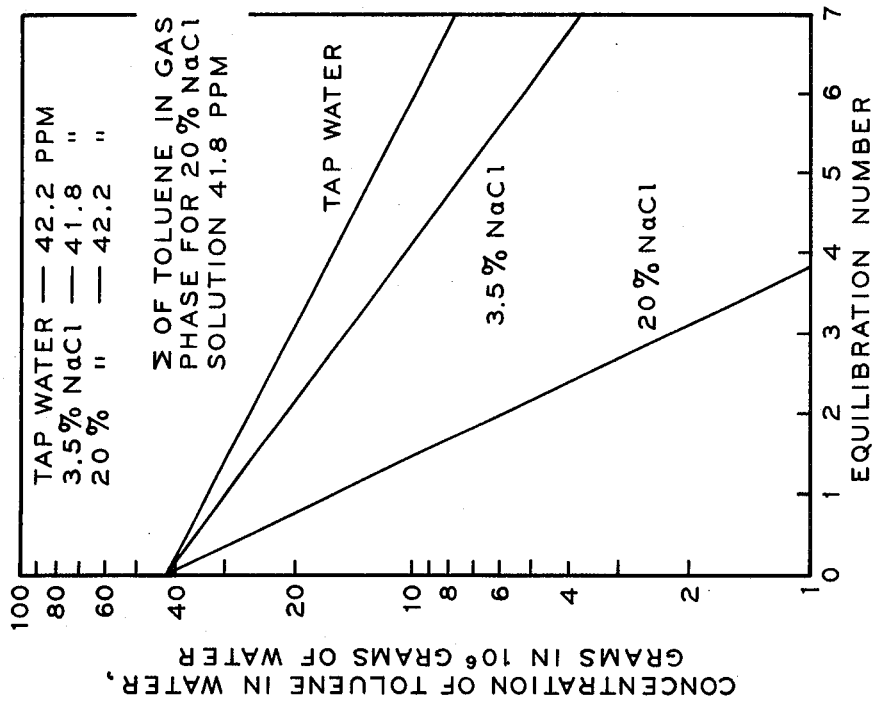
FIG. 5 is a graph illustrating determination of toluene in three salinity waters and helium at 25° C for successive equilibrations.

One of the principal advantages of the present method is its ability to determine hydrocarbon concentrations accurately in solutions of varying ionic composition. It matters little whether the water is fresh, brackish, seawater, or subsurface brine. FIG. 5, a plot of the data shown in FIG. 4, shows that within 1%, the same concentration is obtained from waters of widely varying salinity, even though the distribution coefficients are markedly changed. In each case the solutions were prepared to contain 42 ppm of toluene.

The analysis can be performed at different temperatures and will back-extrapolate as for varying salinity, provided temperature conditions remain constant (±1° C) during successive equilibrations.

Figure 6:
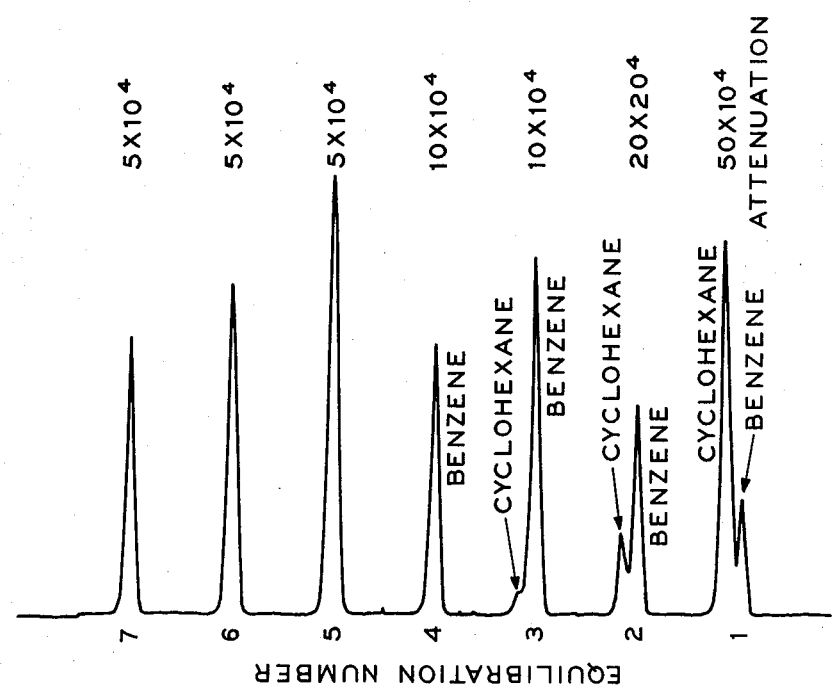
FIG. 6 is a graph illustrating change in concentration of benzene and cyclohexane in gas phase for successive equilibrations of helium with water sample.

The difference in distribution coefficients for different classes of hydrocarbons can be used to determine hydrocarbons not resolved by the chromatographic column. As an example, on some columns cyclohexane and benzene may not be completely resolved, as FIG. 6 illustrates. Through repeated equilibrations, separate, accurate analysis of benzene and cyclohexane can be made without attempting to resolve the overlapping peaks.

From the chromatograms on FIG. 6 as well as the previous discussion of cyclohexane analysis, it is apparent that over 99% of the cyclohexane is removed from water after the third equilibration. Integration of the areas of the combined peaks for the first three equilibrations gives the total concentration of the cyclohexane plus a portion of the benzene. Back-extrapolation of equilibrations four through seven gives the concentration of benzene in the original solution. The straight line through the data points for equilibrations four through seven also permits calculation of the benzene in the gas phase at equilibrations one, two, and three. These benzene concentrations are subtracted from the areas measured for benzene plus cyclohexane. This gives then the concentration of cyclohexane in the original solution.

The solution used in the analysis shown in FIG. 6 contained 70 ppm benzene and 53 ppm cyclohexane in tap water. The described procedure produced values of 69.6 and 53.1. An independent check was obtained by analyzing a water sample containing benzene only. The value for benzene was 70.2 ppm, showing that the cyclohexane did not alter the analysis for benzene. Although the peaks for cyclohexane and benzene are partially resolved, this procedure can be used even when peaks are completely superimposed.

The method of the invention gives good separation of hydrocarbons from highly water-soluble organic compounds, such as alcohols, aldehydes, ethers, and acids. Because of the high water solubilities of these organic compounds, the distributions are highly favored toward the water phase, and little of them is found in the gas phase. If the water phase should contain a sufficiently high concentration of an organic compound for it to appear in the gas phase, then the gas phase concentration decreases very slowly with successive equilibrations. For example, diethyl ether partitions ~96% into the water phase when equal volumes of water and gas are equilibrated. This gives an immediate clue that the compound is a nonhydrocarbon. Such information even in a qualitative sense can be quite useful.

Figure 7:
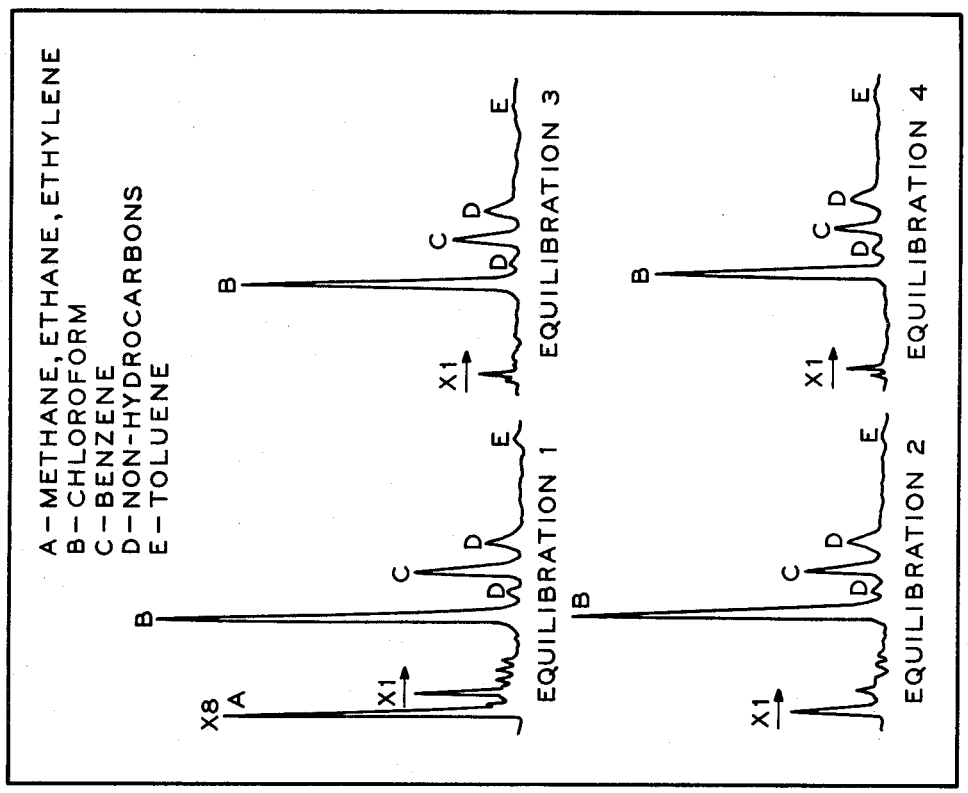
FIG. 7 is a graph illustrating four equilibrations showing organic contaminants in tap water from a city water supply.

Such distribution coefficients, along with relative retention time, help identify unknown organic compounds. An actual example of the identification of organic contaminants in a tap-water sample from a city water supply is shown in FIG. 7. The first equilibration shows the presence of several organic compounds which, if this were the only chromatogram, would be difficult to identify. However, distribution coefficients obtained by additional equilibrations permit positive identification of several of the contaminants.

The first peak is predominantly methane. The next prominent peak has the relative retention time for n-hexane, but the additional equilibrations gave a distribution coefficient that duplicates that for chloroform (as calculated from solubility and vapor pressure data). Chloroform added to water gave the same results.

Benzene and toluene were identified also by relative retention times and partitioning between gas and water phases. The peaks on either side of benzene have not been identified, but their distribution indicates that they are not hydrocarbons. Similarly, the peaks between methane and chloroform are not alkanes, which would have been completely removed after two equilibrations; they may be olefins.

The concentrations in the tap-water sample are low (less than one ppb) but readily measurable. By contrast, only methane is detectable by this method in seawater samples from Cook Inlet, Alaska.

Although one would predict from FIG. 1 that a complex mixture of hydrocarbons would partition as shown, it is always satisfying to see the actual analysis of a complex mixture. Such a mixture, a sample of crude oil from the Black Hollow oil field near Ft. Collins, Colo., was contacted with tap water. The light gases had been separated from the crude oil, so $C_1$ through $C_4$'s were in low concentration.

Figure 8:
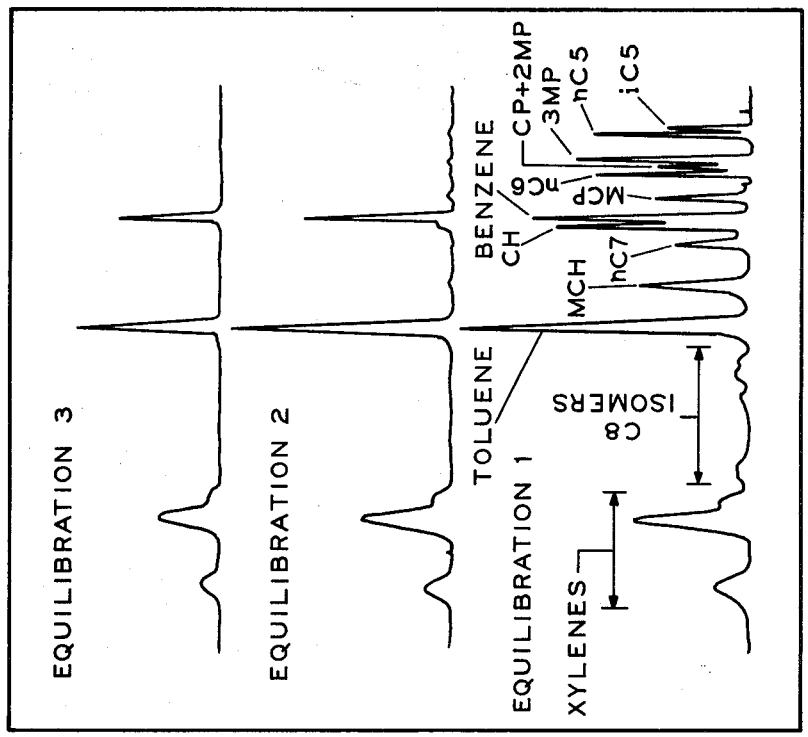
FIG. 8 is a graph showing three equilibrations illustrating hydrocarbons dissolved in tap water from a sample of crude oil with chromatograph attenuation constant.

The water containing the hydrocarbons dissolved from the crude oil was analyzed, and the results are shown in FIG. 8. The first equilibration chromatogram shows all the hydrocarbons through eight carbon atoms normally found in crude oils. As predicted, the first equilibration removed over 96% of the alkanes, leaving aromatic hydrocarbons and about 10% of the cycloalkanes. The third equilibration chromatogram shows only aromatic hydrocarbons.

When we use the described procedure and introduce a 5-ml gas sample into the chromatograph, the method is capable of detecting alkane and cycloalkane hydrocarbons in water if they are present in amounts of one to three parts in $10^{12}$ parts of water by weight. Aromatic hydrocarbons, because of their lower partitioning into the gas phase, can be detected if present in concentrations of 4–12 ppt. Reasonable accuracy can be obtained if the aqueous concentrations are 20 to 30 times these values. Methane is present in open ocean waters in amounts of 28–36 ppt. With the present procedure, methane can be detected at 1 ppt or less. Sensitivity can be increased by analyzing a larger sample of the gas phase and by increasing the ratio of water to gas.

Although the present invention has been described primarily in connection with permitting accurate hyrocarbon measurements on aqueous samples of unknown ionic compositions based on successive gas chromatographic analysis after repeated equilibrations of helium with an aqueous sample containing dissolved hydrocarbons, it is evident that the method has applications of greater diversity. These applications include estimation of distribution coefficients, Henry's law constants, vapor pressure, solubility and several related thermodynamic parameters. Thus the multiple equilibration method of the present invention has broad application. As noted, certain specific embodiments of the invention have been described. The invention is not to be limited to only such embodiments, but rather to the scope of the appended claims.

I claim:
1. A method of determining the presence of volatile compounds in solutions comprising the steps of
   a. isolating in a non-gaseous environment a liquid sample containing foreign volatile compounds in solution;
   b. adding to said sample a known amount of a non-reactive gas;
   c. establishing equilibrium between compounds in solution and in gas phase;
   d. separating said gas phase from said sample so that only liquid phase sample remains in a non-gaseous environment;
   e. analyzing said gas phase for compounds;
   f. repeating steps (b) through (e) at least one more time while maintaining a constant ratio of gas phase to liquid phase and maintaining the temperature constant and g. determining the distribution coefficient based on the concentration of compounds found in any two successive steps (e).

2. A method of determining the presence of volatile compounds in aqueous solutions comprising the steps of a. isolating in a non-gaseous environment an aqueous liquid sample containing foreign volatile compounds in solution;

b. adding to said sample a known amount of a nonreactive gas;

c. establish equilibrium between compounds in solution and in gas phase;

d. separating said gas phase from said sample so that only liquid phase sample remains in a non-gaseous environment;

e. analyzing said gas phase for compounds;

f. repeating steps (b) through (e) at least one more time while maintaining a constant ratio of gas phase to liquid phase and maintaining the temperature constant and g. determining the distribution coefficient based on the concentration of compounds found in any two successive steps (e).

3. A method of determining the presence of volatile hydrocarbons in aqueous solutions comprising the steps of a. isolating in a non-gaseous environment a liquid sample containing volatile hydrocarbons in solution;

b. adding to said sample a known amount of a nonreactive hydrocarbon-free gas;

c. establish equilibrium between hydrocarbons in solution and in gas phase;

d. separating said gas phase from said sample so that only liquid phase sample remains in a non-gaseous environment;

e. analyzing said gas phase for hydrocarbons;

f. repeating steps (b) through (e) at least one more time while maintaining a constant ratio of gas phase to liquid phase and maintaining the temperature constant and g. determining the distribution coefficient based on the concentration of hydrocarbons found in any two successive steps (e).

4. A method of determining the presence of volatile hydrocarbons in aqueous solutions comprising the steps of 'a. isolating in a hypodermic syringe in non-gaseous environment a liquid sample containing volatile hydrocarbons in solution;

b. adding to said sample in said syringe a known amount of a nonreactive hydrocarbon-free gas;

c. establish equilibrium in said syringe between hydrocarbons in solution and in gas phase;

d. removing said gas phase from said syringe while retaining said sample in said syringe so that only liquid phase sample remains in a non-gaseous environment in said sample;

e. analyzing said gas phase for hydrocarbons;

f. repeating steps (b) through (e) at least one more time while maintaining a constant ratio of gas phase to liquid phase and maintaining the temperature constant and g. determining the distribution coefficient based on the concentration of hydrocarbons found in any two successive steps (e).

* * * * *